United States Patent [19]
deGeus

[11] 4,081,966
[45] Apr. 4, 1978

[54] SOLAR OPERATED CLOSED SYSTEM POWER GENERATOR

[76] Inventor: Arie M. deGeus, 6625 - 4th St. South, St. Petersburg, 33705

[21] Appl. No.: 774,211

[22] Filed: Mar. 3, 1977

[51] Int. Cl.² .............................................. F03G 7/02
[52] U.S. Cl. ...................................... 60/641; 60/690; 60/692; 126/271; 165/104 R; 165/107; 165/129
[58] Field of Search ......................... 60/641, 690, 692; 165/104 R, 107, 129; 126/270, 271

[56] References Cited

U.S. PATENT DOCUMENTS 3,987,631  10/1976  Heller et al. ............................. 60/690

FOREIGN PATENT DOCUMENTS 1,980,641  5/1951  France ................................. 165/129

Primary Examiner—Allen M. Ostrager
Assistant Examiner—Stephen F. Husar
Attorney, Agent, or Firm—Dressler, Goldsmith, Clement, Gordon & Shore, Ltd.

[57] ABSTRACT

A solar operated closed system power generator is provided in which a low boiling fluid is vaporized and superheated by the solar energy concentrated within a parabolic reflector upon an elongated boiler which extends along the focus of the reflector. Turbine means are connected to the boiler for obtaining power by the expansion of the superheated vapor and the expanded vapors are condensed in a condenser positioned in the shadow of the reflector. The condenser is cooled by cooling air which is moved through the condenser by means of a draft provided by the convection discharge of gases heated by the reflector, and pump means are provided for transferring the liquefied exhaust gases in the condenser to the boiler at the greater pressure prevailing therein.

4 Claims, 4 Drawing Figures

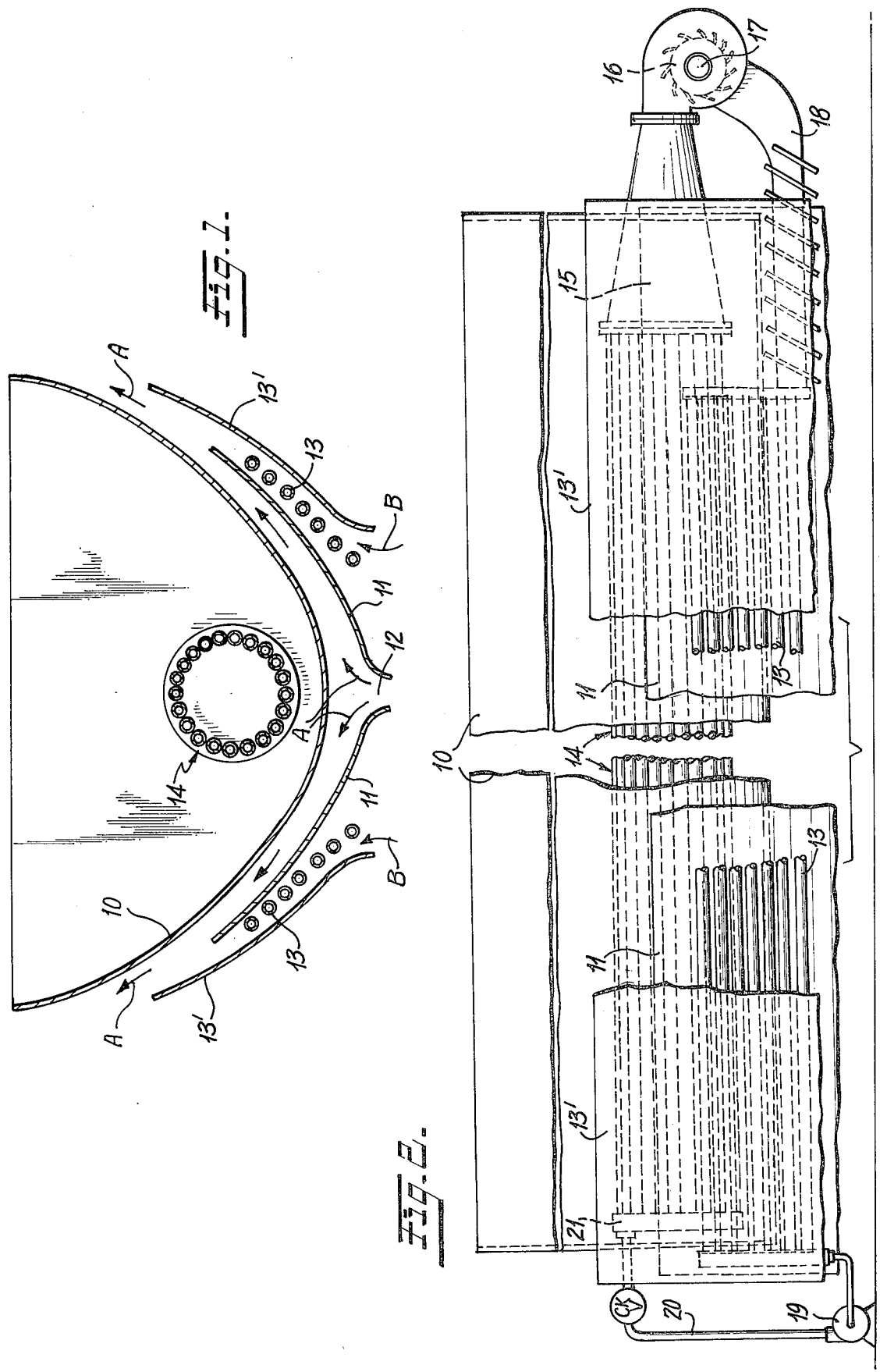

SOLAR OPERATED CLOSED SYSTEM POWER GENERATOR

The present invention relates to solar operated closed system power generators in which a low boiling fluid is vaporized and superheated by the solar energy concentrated within a parabolic reflector to provide superheated fluid at elevated pressure for the operation of a turbine and the exhaust gases from said turbine are condensed to liquefy the same by cooling air which is moved through the condenser by means of a draft of air provided by the convection discharge of gases heated by the reflector.

The effort to transform solar energy into useful form has considered diverse opportunities, but one of the most promising involves a closed system power generator in which a low boiling fluid, such as a fluorinated hydrocarbon, is vaporized by solar energy and used to drive a turbine. In this invention, the heat needed to vaporize and superheat the low boiling fluid is supplied by a parabolic reflector and the condenser is cooled by means of air which is moved through the condenser by means of a draft of air provided by the convection discharge of gases heated by the reflector. In this way, the reflector provides both the heat and the cooling required by the different portions of the closed system power generator.

The invention will be more fully understood from the accompanying drawings in which;

FIG. 1 is a diagrammatic cross-section of a parabolic reflector provided with an elongated boiler and a condenser in accordance with this invention; and FIG. 2 is a diagrammatic side elevation showing a power generating system which is appropriate for use with the reflector-boiler-condenser combination shown in FIG. 1.

Referring more particularly to the drawing, 10 identifies a parabolic reflector. Beneath the reflector 10 are shields 11 which are open to the atmosphere at the base of the reflector as indicated at 12. As a result, when solar energy is received by the reflector, some of this energy heats the material of the reflector and this creates a chimney effect in which air is drawn in through openings 12 near the base of the reflector and is moved upwardly between the reflector 10 and the shields 11. This movement of air is shown by arrows A. The condenser 13 is housed outside of the shield 11 and within a housing 13. The movement of air shown by arrows A induces a movement of cooling air through the condenser 13 as shown by arrows B. The shields 11 prevent the heat of the reflector 10 from reaching the condenser 13. At the same time, the bulk of the solar energy is concentrated at the heat collector 14 which provides an elongated boiler extending along the focus of the reflector.

As will be appreciated, the reflector may be moved to keep it pointed toward the sun, and the condenser 13 is positioned to keep it in the shadow of the reflector.

It will be understood that the chimney construction shown in FIG. 1 is merely illustrative, and it is only necessary in this invention that the condenser be cooled by means of cooling air which is moved through the condenser by means of a draft provided by the convection discharge of gases heated by the reflector as noted by arrows A.

The details of operation are shown in FIG. 2 where it will be seen that the reflector 10 heats the collector 14 which is constituted by a plurality of copper tubes welded together to form a ring as pictured in FIG. 1. The use of small tubes in a circular body increases the heat transfer surface area approximately three fold.

The superheated gases produced in the heat collector 14 (which serves as a boiler and superheater) are supplied to a turbine inlet housing 15 which leads to a centrifugal turbine 16 which operates a shaft 17 from which external power can be obtained. The reduced pressure gases exhausting from the turbine 16 enter a duct 18, and these gases are still superheated to a small extent since efficient operation of the turbine is facilitated by avoiding condensation therein. While a centrifugal turbine is pictured, other turbines can be used, especially in larger installations. The turbine can be single or double stage turbines depending on the pressure ratio which would normally range from 4.5:1 to 6:1.

The exhaust duct 18, which may have fins thereon to air cooling, empties into condenser 13 which is positioned and air cooled as previously described.

It should be observed that the heat collector 14 is at a slight angle to the horizontal so that any vapor bubbles are forced to move rapidly toward the turbine which optimizes heat transfer. The condenser 13 is also at a slight angle so that condensed fluid gravitates toward a pump described below.

The liquid formed by condensation in the condenser 13 is withdrawn therefrom by a pump 19 which forces the liquid through line 20 and discharges it into a header 21 at the inlet end of the heat collector 14 which is the boiler of the system. The pressure in the collector 14 is about 8-9 atmospheres in typical operation and the condenser pressure is typically 1.7 atmospheres so that the pump must be selected to work against this pressure differential. The pump 19 can be geared to the turbine shaft 17 or can be driven electrically using a portion of the power which is generated by the system.

The reflector's size and length should be related to the length and size of the boiler and also to the speed of movement of fluid through the system and the operating pressures so as to insure that the low boiling liquid is vaporized and superheated to a considerable extent since the vapor in the turbine cannot be allowed to condense.

The system is started by operating the pump 19 to supply fluid in liquid form to the elongated boiler. This can be automatically actuated by a thermostat which senses the temperature within the boiler.

Suitable low boiling fluids are fluorinated hydrocarbons which are available in commerce.

It is desired to stress that the condenser 13 is air cooled and a considerable volume of cooling air must be passed over the tubes of the condenser in order to provide the needed cooling for the simple reason that air is not an efficient coolant because of the poor coefficient of heat transmission through an air-metal interface. Such a large volume of air would require fans to produce a forced draft, and the expense and inefficiency introduced by the operation of such fans would be quite detrimental.

The invention is defined in the claims which follow.

I claim:

1. A solor operated closed system power generator which utilizes a low boiling fluid comprising, parabolic reflector means for concentrating solar energy, an elongated boiler extending along the focus of said reflector, said reflector being dimensioned with respect to said boiler to vaporize the liquid which is supplied to said boiler against the elevated pressure prevailing therein, and to superheat the vapor so-produced, turbine means connected to said boiler for obtaining power by the expansion of said superheated vapor, means to convey the exhaust from said turbine to condenser means positioned in the shadow of said reflector, said condenser serving to liquefy the exhaust gases obtained from said turbine, said condenser being cooled by means of cooling air which is moved through the condenser by means of a draft provided by the convection discharge of air heated by said reflector, and pump means for transferring the liquefied exhaust gases in said condenser to said boiler at the greater pressure prevailing therein.

2. A solar operated closed system power generator as recited in claim 1 in which shield means are provided beneath said reflector and spaced therefrom, said shield means having an air inlet at the base of the reflector and said shield means extending upwardly along at least one side of said reflector so that the heat of the reflector heats air between the reflector and said shield means to create a draft of air, housing means positioned outside of said shield means so that said draft of air induces movement of cooling air through the space between said housing means and said shield means, said condenser being positioned within the space between said housing means and said shield means.

3. A solar operated closed system power generator as recited in claim 1 in which said elongated boiler and said condenser are each positioned at a slight angle to the horizontal.

4. A solar operated closed system power generator as recited in claim 1 in which said elongated boiler is constituted by a plurality of tubes secured together to form a ring.

* * * * *